United States Patent [19]

Baker et al.

[11] 4,432,032

[45] Feb. 14, 1984

[54] AUXILIARY VOLTAGE SNUBBER CIRCUIT

[75] Inventors: Richard H. Baker, Bedford, Mass.; Miroslav Glogolia, Somerville, N.J.

[73] Assignee: Exxon Research and Engineering Company, Florham Park, N.J.

[21] Appl. No.: 353,095

[22] Filed: Mar. 1, 1982

Related U.S. Application Data

[63] Continuation of Ser. No. 115,283, Jan. 25, 1980, abandoned.

[51] Int. Cl.³ .................. H02H 7/20; H02H 7/122
[52] U.S. Cl. ......................... 361/111; 361/91; 307/252 M; 363/56; 363/131; 363/132
[58] Field of Search .............. 361/91, 88, 110, 111, 361/98, 100, 4; 307/253, 252 M; 363/56, 95, 96, 23, 21, 19, 131–138

[56] References Cited

U.S. PATENT DOCUMENTS

| | | | |
|---|---|---|---|
| 3,098,949 | 7/1963 | Goldberg | 361/100 |
| 3,257,604 | 6/1966 | Colclaser et al. | 363/132 |
| 3,532,903 | 10/1970 | Roth | 307/253 |
| 3,725,742 | 4/1973 | Pollard | 361/100 |
| 3,794,885 | 2/1974 | Kishi et al. | 361/100 |

Primary Examiner—Patrick R. Salce
Attorney, Agent, or Firm—James A. Hudak

[57] ABSTRACT

In an inverter comprising power transistors selectively switched on and off to supply a predetermined current waveform to an inductive load, including a standard RC voltage snubber for suppressing load generated voltage surges during turn-off transitions of the switching transistors, an auxiliary snubber is connected across the load to provide snubbing at the start of the turn-off transitions when the conventional voltage snubber is inoperative due to an inherent snubber time constant. The auxiliary snubber comprises a grounded capacitor that is maintained charged directly from the voltage supply. The output of the capacitor is connected to the load through an SCR that is gated on during the on periods of the switching transistors during normal operation. The output voltage is equal to the auxiliary snubber capacitor voltage during normal operation so that there is no current flow through the SCR. During a load current overload, the switching transistors are turned off. Because the output voltage during overload is less than the auxiliary snubber capacitor voltage, the capacitor immediately discharges into the load to supply the overload current.

18 Claims, 7 Drawing Figures

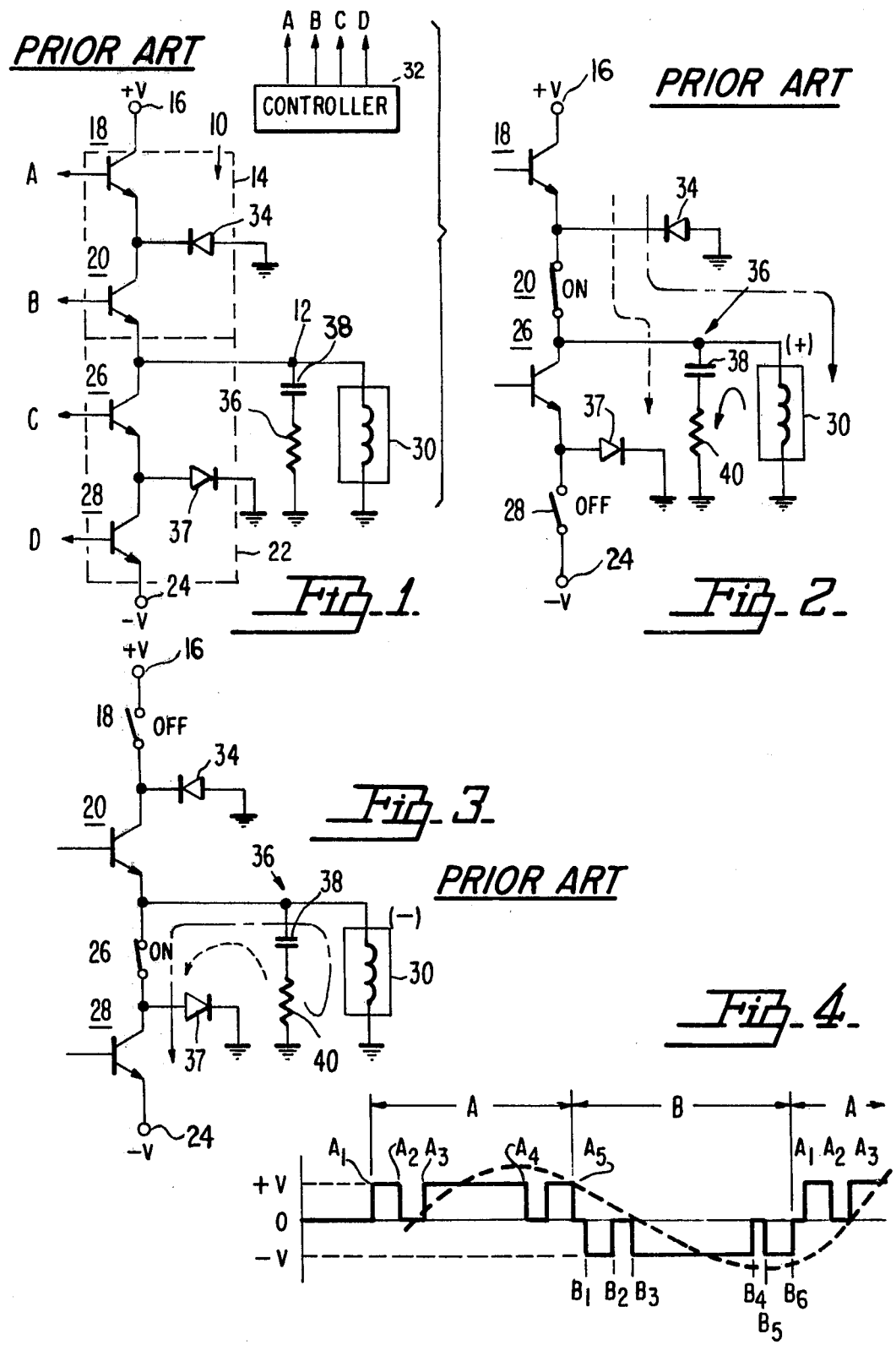

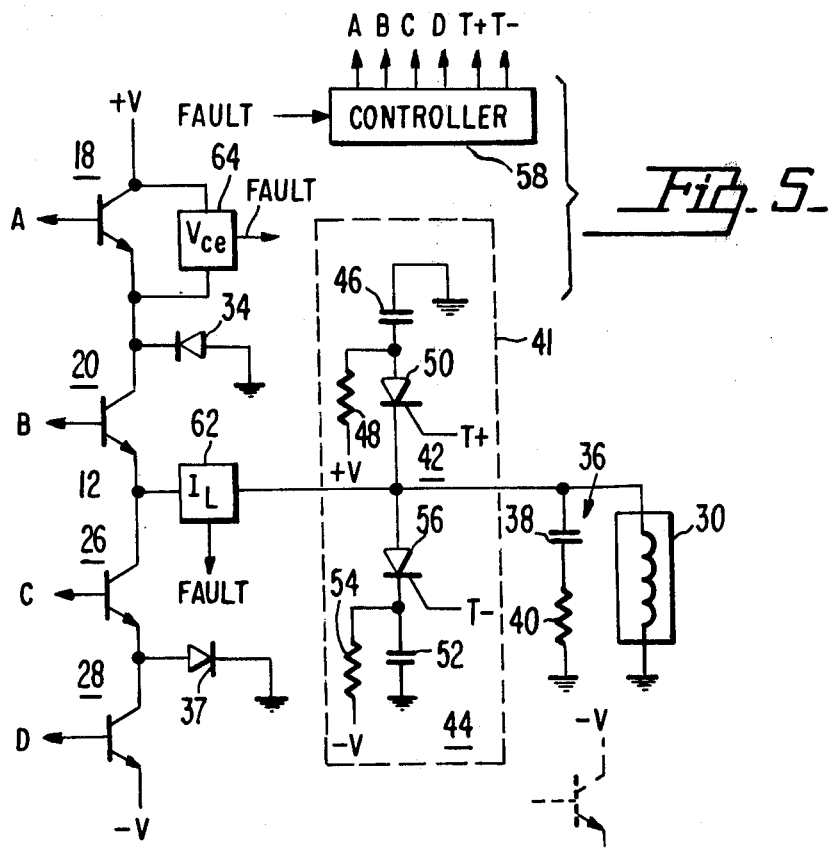
_Fig. 5_
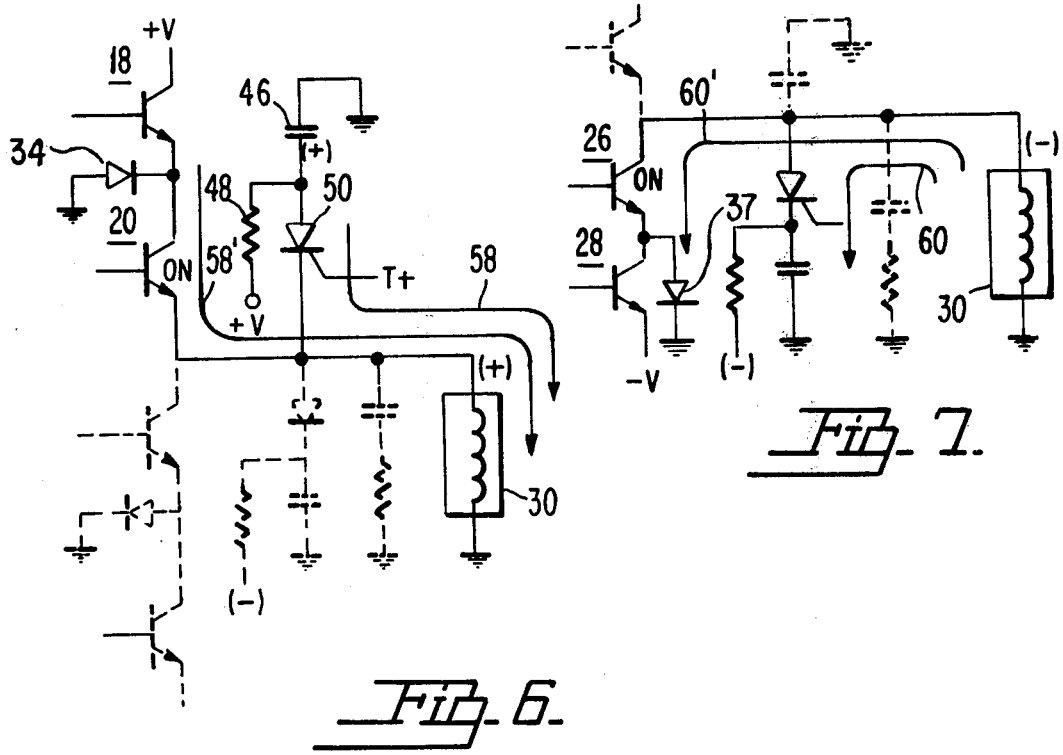
_Fig. 6_
_Fig. 7_

AUXILIARY VOLTAGE SNUBBER CIRCUIT

This is a continuation of application Ser. No. 115,283, filed Jan. 25, 1980, now abandoned.

TECHNICAL FIELD

The present invention relates generally to RC type voltage snubber circuits, and more particularly, to an auxiliary voltage snubber circuit that protects switching transistors under inductive loading at the start of turn-off transitions when the conventional snubber is inherently inoperative.

BACKGROUND ART

High power switching transistors are sensitive to turn-off conditions, particularly when operating in the presence of an inductive load. Inductive loading tends to create high instantaneous power dissipation in the transistors during switching because the locus of the operating point defines a path in the ($I_c V_{ce}$) plane that is significantly placed from the origin. In order to increase turn-off speed, which is necessary to minimize turn-off power dissipation, a negative bias is generally applied to the base terminal of the transistor (power transistors are typically of the NPN type) resulting in reverse current drive. This negative bias promotes current crowding causing local hot spots, second breakdown and burnout. Transistor turn-off during a system fault is particularly difficult because the transistors may be conducting abnormally high current during turn-off. It is a general object of the present invention to reduce the current flow through a power switching transistor during turn-off in the presence of load current overload to reduce turn-off power dissipation.

When a transistor having a inductive load is turned off, the sudden reduction of current flowing through the inductive load causes its magnetic flux field to collapse. The collapsing flux produces a back electromotive force (EMF) of voltage across the inductor at such a polarity as to generate a current to oppose the changing flux. In high magnitude loads of the type commonly encountered in motor control, for example, and switching times on the order of one microsecond or less, the back EMF applied across the transistor may be on the order of magnitude of 100's of kilovolts at high instantaneous current levels.

Voltage snubber circuits connected in shunt with the load protect the switching transistors during turn-off from high inductive load generated surge voltages by providing a flow path to ground for current generated by the back EMF of the inductive load. The snubber capacitor is charged by the voltage supply through the switching transistors during the turn-on periods and discharged through the inductive load during the turn-off periods to provide the snubbing. During each turn-on period, the snubber capacitor charges to the level of the voltage generated by the switching transistors to be discharged through the load during the subsequent turn-off period. Generally, due to the time constant inherent in the RC snubber circuit, the time required to fully charge the snubber capacitor is about 150 microseconds, depending upon particular resistance and capacitance values that are a function of the operating frequency of the inverter, and load current levels. During normal operation, the snubber capacitor always becomes fully charged prior to a subsequent turn-off period since the turn-on periods are much greater than 150 microseconds. In the event of a fault condition occurring during the 150 microsecond time period following transistor turn-on, the snubber circuit is inoperative so that the transistor is unprotected from voltage surges during turn-off by an overload detector. Another object of the present invention, therefore, is to provide auxiliary snubbing during the inoperative period inherent in the conventional snubber circuit at the start of the transistor turn-on transitions.

DISCLOSURE OF INVENTION

In an inverter comprising power switching transistors selectively turned on and off to supply a predetermined current waveform to an inductive load including a conventional RC voltage snubber connected across the load to suppress load generated transient voltages during the turn-off transitions of the transistors, an auxiliary snubber is connected across the load to provide snubbing during turn-off of the transistors in response to a fault condition occurring just after turn-on before the conventional snubber capacitor has fully charged. The auxiliary snubber comprises a grounded capacitor charged directly from the voltage source through a resistor. The output of the capacitor is gated to the load through an SCR. The SCR is turned on during corresponding on periods of the inverter transistors. During normal operation, the output voltage is equal to the auxiliary capacitor voltage so that no current flows through the turned on SCR and snubbing is provided by the primary snubber. In the event of a fault condition causing a load current overload, however, the output voltage is less than the auxiliary capacitor voltage. The auxiliary capacitor discharges into the load through the SCR to supply the overload current to reduce the current flowing through the transistor during the turn-off transition.

In a preferred embodiment, the auxiliary snubber comprises positive and negative legs both connected in shunt with the load and synchronized to the positive and negative legs of a push-pull type inverter that supplies bidirectional current from positive and negative voltage sources to a load. The auxiliary snubber capacitor in the positive leg is charged by the positive voltage source whereas the auxiliary capacitor in the negative leg is charged by the negative voltage source. The SCRs in both snubber legs are poled to discharge capacitor current into the load when turned on synchronously with the transistors in the positive and negative inverter legs in the presence of a load current overload. Current is monitored directly using a current sensor in the output circuit of the inverter or is measured indirectly by monitoring the $V_{ce}$ saturation voltages of the inverter transistors. The output of the overload sensor is supplied to turn off the inverter transistors in the presence of a current overload.

BRIEF DESCRIPTION OF DRAWINGS

FIG. 1 is a circuit diagram showing a push-pull type inverter including a standard RC type voltage snubber;

FIGS. 2 and 3 illustrate charge and discharge current paths through the conventional snubber during operation of the inverter in FIG. 1;

FIG. 4 is a diagram of current and voltage waveforms generated by the inverter of FIG. 1;

FIG. 5 is a circuit diagram showing an auxiliary voltage snubber, in accordance with the invention, connected in circuit with the inverter of FIG. 1; and FIGS. 6 and 7 illustrate the operation of the positive and negative legs of the voltage snubber shown in FIG. 5.

BEST MODE FOR CARRYING OUT THE INVENTION

Referring to FIGS. 1-4, the operation of a standard push-pull type inverter circuit having a conventional RC voltage snubber will be described to better appreciate the operative deficiencies of the conventional snubber solved by the present invention. Inverter and snubbing operations will be described with reference to a single phase inverter or a single phase of a multiple phase inverter. It is to be understood, however, that the principles of the invention are applicable to multiphase inverter systems as well as to other single and multiple phase switching systems. In FIG. 1, a push-pull type inverter, designated generally by the numeral 10, is connected between positive and negative voltage sources +V, −V at terminals 16, 24, respectively, and has an output terminal 12. A positive leg 14 of the inverter 10, connected between the positive supply terminal 16 and output terminal 12, contains a first pair of series connected, NPN power transistors 18, 20; the negative leg 22 connected between the output terminal 12 and negative supply terminal 24 contains a second pair of series connected, NPN transistors 26, 28. The inverter legs 14 and 22 typically also contain series inductors to provide current snubbing during turn-on of the transistors as well as protective diodes to limit reverse voltage applied across the collector and emitter junctions of the transistors and free-wheeling diodes to dissipate snubber inductor induced flyback currents. These conventional snubber circuits and protective diodes are not shown in the figures for simplicity, but are well known and described, for example, in Kuecken, J. A., *Solid State Motor Controls*, Tab Books, 1978 (Chapter 2).

An inductive load 30 connected between output terminal 12 of the inverter 10 and ground receives bidirectional current generated by the inverter legs 14 and 22 as transistors 18, 20, 26 and 28 are selectively sequenced on and off by a conventional sequence controller 32 which may be, for example, a programmed microprocessor, to develop a predetermined load current waveform.

Exemplary voltage and current waveforms generated across a load by an inverter of a type shown in FIG. 1 are illustrated graphically in FIG. 4. It is to be understood, of course, that the waveforms are only exemplary and can be modified in accordance with particular on and off sequencing of transistors 18–28 in legs 14 and 22 of the inverter 10. The output voltage waveform applied to load 30 is shown in solid line in FIG. 4 whereas the corresponding current waveform to the load is shown in dotted line. The voltage waveform, characterized by +V, 0 and −V voltage levels having variable durations controlled by the sequencer 32, is generated by switching the transistors 18, 20, 26 and 28 on and off in the following manner. The voltage level +V is obtained at load terminal 12 when transistors 18 and 20 are on and transistors 26 and 28 are off. The −V voltage level is developed at the output terminal 12 when transistors 26 and 28 are on and transistors 18 and 20 are off. The zero level voltage at output 12 is developed when transistors 20 and 26 are on and transistors 18 and 28 are off. In practice, on transistors are turned off before off transistors are turned on to avoid excessive current flow between the two voltage sources.

During the entire period A (FIG. 4), when a positive voltage waveform is applied by inverter 10 through output terminal 12, transistor 28 is maintained off to disable the negative leg of the inverter (see FIG. 2). Transistor 20 is maintained on during that period so that current flow through load 30 is controlled by turn-on and turn-off of transistors 18 and 26; the output terminal 12 receives +V volts when transistors 18 and 26 are on and off, respectively, and receives ground potential through diode 37 when the transistors are in the opposite states.

During period B when a negative voltage waveform is applied across load 30, transistor 18 is maintained open to disable the positive leg 40 of the inverter (see FIG. 3) and transistor 26 is maintained closed; the negative voltage waveform is thus controlled by the turn-on and turn-off sequencing of transistors 20 and 28. The output terminal 12 receives −V volts when transistors 20 and 28 are off and on, respectively, and receives ground potential through diode 34 when the transistors are in the opposite states.

The operation of inverter 10 including conventional RC snubber 36 will now be described with reference to FIGS. 2 and 3. Considering first generation of the positive waveform during duration A (FIG. 4), with transistor 26 maintained on and transistor 28 maintained off, and assuming that transistors 18 and 26 are initially off and on, respectively, the voltage waveform generated during positive duration A is developed by sequencing transistors 18 and 26 as follows. At time $A_1$, transistor 18 is turned on and transistor 26 is turned off to cause +V volts to be applied from positive source terminal 16 to output terminal 12. At time $A_2$, transistor 18 is turned off and transistor 26 is turned on to establish a current path between ground and output terminal 12 through the transistor 20 and diode 34 in positive inverter leg 14. Each time transistor 18 switches from on to off, a voltage is induced across the inductor 30 having the polarity indicated in FIG. 2 to oppose the negative current change. The self-induced voltage across the load 30 generates a current shown in solid arrow flowing to ground through snubber 36 which comprises a non-electrolytic capacitor 38 and series resistor 40 connected between the inverter output terminal 12 and ground. The effect of the snubber 36 is to suppress the voltage applied across the collector and emitter terminals of transistor 18 during turn-off by providing a shunt path to ground of the back EMF induced current generated by inductive load 30. Values of a capacitor 38 and resistor 40 are determined by the frequency of operation of the inverter and load current magnitude.

During turn-on of transistor 18, load current flows between the transistor and inductive load 30 as shown by the dot-dash arrow. An additional component, however, shown in dotted arrow, flows through transistor 18 to recharge capacitor 38. The recharge time of capacitor 38 is typically on the order of 150 microseconds following turn-on of the transistor 18 depending upon design parameters. During this brief period of time following turn-on of transistor 18, the capacitor 38 is charged insufficiently to provide snubbing during subsequent turn-off of the transistor. This is normally no problem since the transistor 18 is controlled by controller 32 to remain turned on until a subsequent turn-off time which is well in excess of the 150 microsecond recharge time to provide the exemplary voltage waveform of FIG. 4. In the event that transistor 18 is turned off prematurely in response to an overload condition, for example, during the 150 microsecond period of inoperativeness of snubber 36, transistor 18 will be exposed to the switch-off voltage transient generated by inductive load 30.

Similar comments can be made with respect to the operation of snubber 36 during on and off switching of transistors 20 and 28 with transistor 18 maintained off and transistor 26 maintained on during time interval B. Thus, during the turn-off transitions of transistor 28, the back EMF having the polarity indicated in FIG. 3 generated by inductive load 30 causes a current to flow through snubber 36 in the direction of the solid arrow to prevent a surge voltage from being applied across the transistor 28. During turn-on of transistor 28, however, a capacitor recharge current shown in dotted arrow flows through the transistor in addition to negative load current shown in dot-dash arrow. The capacitor recharge current in this direction is again on the order of 150 microseconds.

In accordance with the invention, an auxiliary voltage snubber 41 is connected in shunt with load 30 to generate discharge current to the load only during a brief time period following turn-off of transistor 18 or transistor 28 prior to full recharge of capacitor 38 in the presence of a load current overload. Referring to FIG. 5, auxiliary snubber circuit 41 comprises a positive leg 42 and a negative leg 44 both connected between the output of inverter 10 and ground. The positive leg 42 comprises a first capacitor 46 and a resistor 48 connected in series with each other between the positive voltage source +V and ground. One terminal of capacitor 46 is grounded whereas the other terminal is connected to the resistor 48 and to the anode of a silicon controlled rectifier (SCR) 50. The cathode of SCR 50 is connected to the output of the inverter 10. Similarly, negative leg 44 of auxiliary snubber 41 comprises a capacitor 52 and a resistor 54 connected in series with each other between negative voltage source −V and ground. One terminal of capacitor 52 is grounded whereas the other terminal is connected to resistor 54 and to the cathode of a second SCR 56. The anode of SCR 56 is connected to the output of inverter 10.

The gates of SCRs 50 and 52 are connected to outputs R+ and T− of sequence controller 58 similar to controller 32 in FIG. 1.

The positive leg 42 of auxiliary snubber 41 is synchronized in operation to positive leg 14 of inverter 10. Similarly, the negative leg 44 of the auxiliary snubber 41 is synchronized in operation to negative leg 22 of inverter 10. Specifically, SCRs 50 and 56 are controlled by controller 58 to be normally off. SCR 50 is turned on by controller 58 only during the turn-on periods of transistor 18. Similarly, SCR 56 in negative snubber leg 44 is turned on only during the turn-on periods of inverter transistor 28.

Assuming that SCRs 50 and 56 are both turned off by controller 58, capacitor 46 is charged through resistor 48 to +V volts and capacitor 52 is charged through resistor 54 through −V volts. There is no discharge path for the capacitors 46 and 52 since SCRs 50 and 56 are both off so that the capacitors remain charged to the respective voltage levels. During operation of the positive leg 14 of inverter 10 corresponding to period A in FIG. 4, when transistor 18 is turned on the output voltage at terminal 12 rises rapidly to +V volts through transistors 18 and 20. Thus, although SCR 50 is turned on, there is no current flow through the SCR because the voltages at the anode and cathode are equal. In the event of an overload of output current, however, the voltage at output terminal 12 is maintained below the supply voltage +V and capacitor 46 is discharged into the load 30 (see FIG. 6) along path 58. The capacitor discharge current thus supplies the overload current through load 30 to raise the output voltage at terminal 12 and thereby reduce the amount of current passing through transistors 18 and 20 along flow path 58. It is only necessary for the capacitor discharge current to flow for a few microseconds since after that period of time, transistors 18 and 20 as well as the rest of the inverter will be turned off.

Similarly, during operation of the negative leg 22 of inverter 10 (corresponding to period B in FIG. 4), SCR 56 is turned on by controller 58 synchronously with the turn-on periods of transistor 28. During normal operation, the voltage at output terminal 12 and the voltage on capacitor 52 are each at −V volts during the turn-on periods of transistor 28 so that no capacitor discharge current flows through the SCR. During overload, however, the voltage at output terminal line 12 is less negative than the voltage on capacitor 52 so that the capacitor is discharged through the SCR 56 and through load 30 along current path 60. Because the overload current to load 30 is supplied by capacitor 52, the voltage at output 12 increases in magnitude toward −V volts to reduce the magnitude of current flowing through transistors 26 and 28 along current flow path 60'. Again, it is only necessary for the discharge time capacitor 52 to exceed the period required to turn off transistors. Following discharge of capacitors 46, 52, the capacitors are recharged through their corresponding resistors 48, 54.

With reference to FIG. 5, a fault signal is supplied to controller 58 in response to an overload current flowing in inverter 10. Any suitable circuitry for detecting the overload current may be provided, such as a low value resistor or other current sensor 62 in the output line 12 of the inverter or a transistor collector to emitter saturation voltage detector, such as detector 64, across transistor 18. The detector 64 monitors the voltage across the collector and emitter terminals of transistor 18. During normal saturation of the transistor 18, the collector to emitter saturation voltage is typically around 1.0 volt for a silicon NPN transistor. During excessive current flow, however, the transistor 18 tends to leave its saturation region and the collector to emitter voltage increase. This increase is detected by detector 64 which generates a fault signal to controller 58. In response, controller 58 immediately turns off transistor 18. In the event that turn-off of transistor 18 occurs during the 150 microsecond period of inoperativeness of the primary snubber 36, the auxiliary snubber 40 provides protection of transistor 18 against overheating by reducing current flow through the transistor during turn-off.

We claim:
1. A switching circuit for controlling current flow between a D.C. voltage source and an inductive load, comprising:
   transistor means having a supply terminal to be connected to the voltage source and an output terminal to be connected to the said inductive load;
   control means for selectively turning on and off said transistor means;
   primary snubber means for suppressing an inductive load generated voltage during turn-off of said transistor means including first capacitor means and first resistor means connected directly in shunt with said inductive load, said capacitor means being charged during turn-on periods of said transistor means and discharged through said inductive load during turn-off periods of said transistor means, current generated by the back EMF of said inductive load thereby bypassing said transistor means during said turn-off periods, wherein there is a delay time in said snubber means due to an inherent snubber time constant; and auxiliary snubber means for reducing load current conducted by said transistor means during turn-off transitions of said transistor means during said primary snubber delay time, comprising second capacitor means, means for charging said second capacitor means to a capacitor voltage, means for detecting a load current overload, and means responsive to the load current overload for turning off said transistor means and discharging said second capacitor means into said inductive load as the magnitude of said load voltage drops below that of said capacitor voltage during overload.

2. The switching circuit of claim 1, wherein said charging means includes means independent of said transistor means for charging said second capacitor means.

3. The switching circuit of claim 2, wherein said charging means includes resistor means connected between said voltage source and said second capacitor means.

4. In a repetitive switching circuit comprising transistor means connected between a D.C. voltage source and an inductive load and control means for selectively turning said transistor means on and off to supply a predetermined current waveform to the load;

a snubber circuit, comprising:

primary snubber means connected in shunt with said load for suppressing voltage transients developed by a back EMF of said inductive load during turn-off of said transistor means controlled by said control means, said primary snubber means including first capacitor means and first resistor means connected directly in shunt with said inductive load, a first current flow path being established through said transistor means during turn-on of said transistor means to charge said first capacitor means, and a second current flow path being established between said first capacitor means and said inductive load during turn-off of said transistor means to discharge said first capacitor means through said inductive load and thereby suppress the back EMF voltage developed by said inductive load; and auxiliary snubber means connected in shunt with said load, including second capacitor means charged by said voltage source independently of said transistor means, and means responsive to said control means for turning off said transistor means and discharging said second capacitor means through said load during turn-off of said transistor means in the presence of a load current overload as the magnitude of said load voltage drops below the magnitude of said second capacitor voltage during overload.

5. The switching circuit of claim 4, wherein said charging means includes resistor means connected between said second capacitor means and said voltage source.

6. The switching circuit of claim 5, including means for sensing a load current overload, and means responsive to said overload sensing means for turning off said transistor means.

7. In an inverter comprising transistor means connected between a D.C. voltage source and an inductive load and control means for selectively turning said transistor means on and off to supply a predetermined current waveform to the load;

an improved voltage snubber circuit, comprising:

primary snubber means including first capacitor means and first resistor means connected directly in shunt with said load for suppressing voltage transients produced by back EMF of said inductive load during turn-off transitions of said transistor means by said control means, said primary snubber means having a tendency to be inoperative for a short period of time at the start of some turn-off transitions of said transistor means due to the inherent time constant of said first capacitor means and said first resistor means;

means for detecting a load current overload;

auxiliary snubber means including second capacitor means in shunt with said load;

means for charging said second capacitor means to a capacitor voltage;

means for maintaining said auxiliary snubber means normally gated off, said auxiliary snubber maintaining means including SCR means connected in series with said second capacitor means; and means responsive to said detecting means for turning off said transistor means and gating on said auxiliary snubber means at the start of each turn-off transition of said transistor means during the load current overload to discharge said second capacitor means through said inductive load and thereby reduce current flow in said transistor means during the inoperative periods of said primary snubber means as the magnitude of said load voltage drops below that of said capacitor voltage during the overload.

8. In an inverter comprising transistor means connected between a D.C. voltage source and an inductive load and control means for selectively turning said transistor means on and off to supply a predetermined current waveform to said inductive load, including voltage snubber means connected directtly in shunt with said load for suppressing the back EMF of said inductive load during turn-off of said transistor means by said control means, wherein said snubber means has a tendency to be inoperative for a short period of time at the start of some turn-off transitions of said transistor means due to a time constant inherent in said snubber means;

an improvement comprising:

auxiliary voltage snubber means including a capacitor means connected directly in shunt with said load;

means for charging said capacitor means to a capacitor voltage;

gating means for maintaining said auxiliary snubber means normally gated off;

means for detecting a load current overload; and means responsive to said detecting means for turning off said transistor means and gating on said auxiliary snubber means at the start of each of said turn-off transitions of said transistor means during the current overload to discharge said capacitor means through said load as the magnitude of the load voltage drops below that of said capacitor voltage during overload to provide snubbing during the inoperative periods of said snubber means.

9. In a push-pull inverter comprising a positive leg to be connected between a positive D.C. voltage source and an inductive load and a negative leg to be connected between a negative D.C. voltage source and the load, said positive and negative inverter legs containing transistor means, and control means for selectively turning said transistor means on and off to supply a predetermined bidirectional current waveform to said inductive load, and primary voltage snubber means connected directly in shunt with said inductive load for suppressing inductive load generated transient voltages generated by said inductive load during turn-off transitions of said transistor means, wherein said primary snubber means has a tendency to be inoperative at the start of some turn-off transitions of said transistor means due to a time constant inherent in said snubber means;
   an improvement comprising:
   auxiliary voltage snubber means including a capacitor means connected directly in shunt with said load;
   means for charging said capacitor means to a capacitor voltage;
   means for maintaining said auxiliary snubber means normally gated off;
   means for detecting a load current overload, and
   means responsive to said detecting means for turning off said transistor means and gating on said auxiliary snubber means at the start of a turn-off transition of said transistor means during current overload to discharge said capacitor means through said load as the magnitude of a load voltage drops below that of said capacitor voltage during overload to provide voltage snubbing during a said inoperative period of said snubber means.

10. The improvement of claim 9, wherein said primary snubber means includes first capacitor means charged through said transistor means.

11. The improvement of claim 10, wherein said auxiliary snubber means includes second capacitor means and means independent of said transistor means for charging said second capacitor means, said gating off means including normally open switch means in series with said second capacitor means, and said gating on means including means for closing said switch means.

12. The improvement of claim 11, wherein said auxiliary snubber means includes positive and negative snubber legs each to be connected between the load and a voltage supply ground, said switch means including first and second normally off gating means respectively in said positive and negative legs, said detecting means including first means for detecting an overload current in said positive inverter leg and second means for detecting an overload current in said negative inverter leg, and means responsive to said first and second detecting means for closing respectively said first and second gating means.

13. The improvement of claim 12, wherein said first gating means includes a first SCR connected between said first capacitor means and the load and said second gating means includes a second SCR connected between said second capacitor means and the load, a first resistor being connected between the positive voltage source and a load interconnecting said first capacitor means and said first SCR, a second resistor being connected between the negative voltage source and a load interconnecting the second capacitor means and said second SCR, said first SCR and said second SCR being poled to conduct current when turned on between said positive and negative voltage supply and the load.

14. The improvement of claim 13, wherein said first and second detecting means include means for monitoring saturation voltages of said transistor means respectively in said first and second inverter legs.

15. The improvement of claim 14, wherein said first and second detecting means includes means for measuring an output current of said inverter.

16. A switching circuit for controlling current flow between a D.C. voltage source and an inductive load, comprising:
   transistor means having a supply terminal to be connected to the voltage source and an output terminal to be connected to the load;
   control means for selectively turning on and off said transistor means;
   primary snubber means for suppressing an inductive load generated voltage during turn-off of said transistor means including first capacitor means in shunt with said load, said capacitor means being charged during turn-on periods of said transistor means and discharged through said inductive load during turn-off periods of said transistor means, current generated by the back EMF of said inductive load thereby bypassing said transistor means during said turn-off periods, wherein there is a delay time in said snubber means due to an inherent snubber time constant; and
   auxiliary snubber means for reducing load current conducted by said transistor means during turn-off transitions of said transistor means during said primary snubber delay time, comprising second capacitor means, means for charging said second capacitor means to a capacitor voltage, said charging means comprising means independent of said transistor means for charging said second capacitor means and including resistor means connected between said voltage source and said second capacitor means, means for detecting a load current overload, SCR means connected between said second capacitor means and said output terminal, control means for turning on said SCR means during turn-on periods of said transistor means, said SCR means being poled to discharge said second capacitor means during turn-on of said SCR means, and means responsive to the load current overload for turning off said transistor means and discharging said second capacitor means into said load as the magnitude of said load voltage drops below that of said capacitor voltage during overload.

17. In a repetitive switching circuit comprising transistor means connected between a D.C. voltage source and an inductive load and control means for selectively turning said transistor means on and off to supply a predetermined current waveform to the load;
   a snubber circuit, comprising:
   primary snubber means connected in shunt with said load for suppressing voltage transients developed by a back EMF of said inductive load during turn-off of said transistor means controlled by said control means, said primary snubber means including first capacitor means in shunt with said load, a first current flow path being established through said transistor means during turn-on of said transistor means to charge said first capacitor means, and a second current flow path being established between said first capacitor means and said load during turn-off of said transistor means to discharge said first capacitor means through said inductive load and thereby suppress the back EMF voltage developed by said inductive load;

auxiliary snubber means connected in shunt with said load including second capacitor means, means for charging said second capacitor means independently of said transistor means, said charging means including resistor means connected between said second capacitor means and said voltage source, SCR means connected between said second capacitor means and said output terminal, control means for turning on said SCR means during turn-on periods of said transistor means, said SCR means being poled to discharge said second capacitor means during turn-on of said SCR means, and means responsive to said control means for turning off said transistor means and discharging said second capacitor means through said load during turn-off of said transistor means in the presence of a load current overload as the magnitude of said load voltage drops below the magnitude of said second capacitor voltage during overload.

18. In an inverter comprising transistor means connected between a D.C. voltage source and an inductive load and control means for selectively turning said transistor means on and off to supply a predetermined waveform to the load;

an improved voltage snubber circuit, comprising;

primary snubber means including first capacitor means in shunt with said load for suppressing voltage transients produced by back EMF of said inductive load during turn-off transistions of said transistor means by said control means, said primary snubber means being of a type that has a tendency to be inoperative for a short period of time at the start of some turn-off transitions of said transistor means due to a time constant inherent in said primary snubber means;

means for detecting a load current overload;

auxiliary snubber means including second capacitor means in shunt with said load;

means for charging said second capacitor means to a capacitor voltage, said charging means being independent of said transistor means;

means for maintaining said auxiliary snubber means normally gated off, said maintaining means including SCR means connected in series between said second capacitor means and said load and being poled to discharge said second capacitor means into said load when said SCR means is turned on; and means responsive to said detecting means for turning off said transistor means and gating on said SCR means at the start of each turn-off transistion of said transistor means during the load current overload to dischage said second capacitor means through said load and thereby reduce current flow in said transistor means during the inoperative periods of said primary snubber means as the magnitude of said load voltage drops below that of said second capacitor voltage during the overload.

* * * * *